United States Patent
Maurice et al.

(10) Patent No.: US 11,347,078 B2
(45) Date of Patent: May 31, 2022

(54) METHOD FOR PERMANENT VISIBLE MARKING OF AN OPTICAL ARTICLE AND MARKED OPTICAL ARTICLE

(71) Applicant: ESSILOR INTERNATIONAL, Charenton-le-Pont (FR)

(72) Inventors: Sébastien Maurice, Charenton-le-Pont (FR); Gerhard Keller, Charenton-le-Pont (FR); Michèle Thomas, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 493 days.

(21) Appl. No.: 16/318,249

(22) PCT Filed: Jul. 18, 2017

(86) PCT No.: PCT/FR2017/051949
§ 371 (c)(1),
(2) Date: Jan. 16, 2019

(87) PCT Pub. No.: WO2018/015650
PCT Pub. Date: Jan. 25, 2018

(65) Prior Publication Data
US 2019/0171034 A1 Jun. 6, 2019

(30) Foreign Application Priority Data
Jul. 18, 2016 (FR) ........................ 1656851

(51) Int. Cl.
*G02C 7/02* (2006.01)
*G02C 7/10* (2006.01)
(Continued)

(52) U.S. Cl.
CPC .......... *G02C 7/021* (2013.01); *B23K 26/0622* (2015.10); *B23K 26/0626* (2013.01);
(Continued)

(58) Field of Classification Search
CPC .......... G02C 7/021; G02C 7/107; G02B 5/26; G02B 1/111; G02B 1/118; G02B 1/115;
(Continued)

(56) References Cited

U.S. PATENT DOCUMENTS 4,912,298 A * 3/1990 Daniels .................... B41M 5/26
219/121.73
9,651,801 B2 * 5/2017 Okubo ................... G02B 1/115
(Continued)

FOREIGN PATENT DOCUMENTS

| EP | 0 677 764 A1 | 10/1995 |
| FR | 2 943 798 A1 | 10/2010 |

(Continued)

OTHER PUBLICATIONS

International Search Report, dated Nov. 23, 2017, from corresponding PCT/FR2017/051949 application.

*Primary Examiner* — Marin Pichler
*Assistant Examiner* — Alberto J Betancourt
(74) *Attorney, Agent, or Firm* — Nixon & Vanderhye (57) ABSTRACT

Disclosed is a method for marking an optical article coated with an interference coating including at least two layers, an inner layer and an outer layer, and having reflection coefficient Re; by exposure of the inner layer, at a marking point, by way of a laser beam at a marking wavelength, in such a way as to ablate the inner layer and any layer further away from the substrate; the ablated area having a reflection coefficient Rm different from Re by at least 1%; the inner layer absorbing the marking wavelength to a greater degree than any layer further away from the substrate. Also disclosed is an optical article coated with an interference coating having at least two layers, an inner layer and an outer layer, the article including a marking pattern formed by local absence of layers.

20 Claims, 3 Drawing Sheets

(51) Int. Cl.
  *G02B 5/26* (2006.01)
  *B24B 13/005* (2006.01)
  *B23K 26/50* (2014.01)
  *B23K 26/0622* (2014.01)
  *B23K 26/06* (2014.01)
  *G02B 1/115* (2015.01)
  *G02B 1/111* (2015.01)
  *G02B 1/118* (2015.01)
  *B23K 26/382* (2014.01)

(52) U.S. Cl.
  CPC ............ *B23K 26/382* (2015.10); *B23K 26/50* (2015.10); *B24B 13/0055* (2013.01); *G02B 1/111* (2013.01); *G02B 1/115* (2013.01); *G02B 1/118* (2013.01); *G02B 5/26* (2013.01); *G02C 7/107* (2013.01)

(58) Field of Classification Search
  CPC .. B23K 26/50; B23K 26/0622; B23K 26/382; B23K 26/0626; B24B 13/0055
  USPC ........ 351/41, 159.01, 159.73, 159.74, 159.8, 351/159.69; 264/1.32, 2.6, 2.7, 1.37, 400, 264/409, 487, 482; 427/554; 219/121.61
  See application file for complete search history.

(56) References Cited

U.S. PATENT DOCUMENTS

| | | | |
|---|---|---|---|
| 2004/0095645 A1* | 5/2004 | Pellicori | G09F 13/06 359/584 |
| 2006/0051501 A1* | 3/2006 | Conte | G02B 1/105 427/162 |
| 2008/0206470 A1 | 8/2008 | Thomas et al. | |
| 2010/0102025 A1* | 4/2010 | Eagerton | G02B 1/12 216/13 |
| 2010/0141729 A1* | 6/2010 | Petsch | B41M 5/267 347/225 |
| 2012/0013845 A1 | 1/2012 | Conte et al. | |
| 2014/0016083 A1* | 1/2014 | Macionczyk | B23K 15/08 351/159.6 |
| 2014/0354945 A1* | 12/2014 | Martinu | G02B 1/14 351/159.62 |
| 2016/0124120 A1* | 5/2016 | Varanasi | G02B 1/116 359/586 |
| 2016/0207249 A1* | 7/2016 | Maurice | B29D 11/00932 |

FOREIGN PATENT DOCUMENTS

| | | | |
|---|---|---|---|
| JP | 2012-522259 A | 9/2012 | |
| JP | 2016-007612 A | 1/2016 | |
| WO | 2015/040338 A1 | 3/2015 | |
| WO | WO-2015040338 A1 * | 3/2015 | ........... B23K 26/361 |

* cited by examiner

METHOD FOR PERMANENT VISIBLE MARKING OF AN OPTICAL ARTICLE AND MARKED OPTICAL ARTICLE

The present invention relates to the general field of permanent visible marking of optical articles, typically ophthalmic lenses, coated with a multilayer interference coating.

It is known that ophthalmic lenses, such as spectacle lenses, undergo various manufacturing steps. One of these steps comprises marking the ophthalmic lens on one of its faces with what are called permanent markings. These permanent technical markings are formed from engravings, or micro-engravings, representing points or crosses and identifying a particular point (for example the optical center of the ophthalmic lens or the prism reference point for a progressive lens), or axis lines (for example for indicating the horizontal axis along which astigmatism is corrected), or shapes bounding a particular zone (for example a near vision zone or a far vision zone in the case of a progressive lens).

These permanent markings, whether they be technical or commercial markings, are often produced on one face (the front face or back face) of the ophthalmic lenses, certain markings possibly being produced on the front face and others on the back face. By "back face" or "interior face" (which is generally concave) of the substrate, what is meant is the face that, during use of the article, is closest to the eye of the wearer. Conversely, by "front face" or "exterior face" (which is generally convex) of the substrate, what is meant is the face that, during use of the article, is furthest from the eye of the wearer.

The most widespread methods for marking optical articles at the present time are ink marking and laser marking (i.e. marking with a laser beam).

Ink marking has the drawbacks that it is difficult to find a permanent ink that is compatible with any type of ophthalmic-lens surface, and that this type of marking is not only visible to an exterior observer but also to the wearer of the ophthalmic lens.

Documents US 2004/0095645 and EP 0677764 of Jax Holdings Inc. each describe a method for constructing an interference coating by successive deposition of layers on a transparent substrate, during which a mask forming a pattern is printed on a base layer before the deposition of the following layers. The mask is printed with an ink configured to be cleaned off using a solvent. The mask is removed after deposition of the following layers so that the interference coating has a lesser thickness in the portions that were occupied by the mask. The coating has reflection properties that differ depending on its thickness, this making the pattern visible. Such a technique is long and expensive, and requires complex machines to be used.

Laser marking may also be carried out by ablation (i.e. removal of an amount of material) so as to engrave the surface. Thus, the marking is generally formed from a series of points, termed marking points or spots, each marking spot being produced by one or more pulses of the laser. In this case, the marking has a visibility that depends on the depth and on the width of the marking spots, and on the thickness and nature of the one or more ablated layers. This marking must also be positioned outside of the field of view of the ophthalmic-lens wearer in order not to perturb his vision.

Document US 2014/0016083 describes an improvement of the latter technique, according to which a marking may be produced by laser beam on the convex surface of an ophthalmic lens after vacuum deposition of a coating of thin oxide layers. These thin layers are applied in a certain order, and are then, successively exposed to the laser beam, and therefore successively ablated. The treated surface therefore has a different visibility to the untreated surface. This allows a marking that is visible to an exterior observer to be produced, because different colours are visible to an exterior observer in case of illumination with white light.

However, this ablated solution implemented by means of a laser beam has the major problem that the marking is not easily controllable, mainly depthwise. Therefore, the marking spots produced by repeating a marking step in various points belonging to a given pixel are not generally contiguous, this implying that the marking is not continuous. According to this document, a succession of multiple partial ablations in a given pixel makes it possible to avoid the problem of engraving to too great a depth (i.e. of applying the laser beam too much in one given location), which could lead to the undesired effect of a coating of the ophthalmic lens, such as an antireflection coating or indeed an anti-scratch coating, being partially or completely attacked by the laser beam.

One of the objectives of the invention is to provide a method for marking optical articles that mitigates the drawbacks of the prior art, in particular the problems of undesired ablation of all or some of a coating of the optical article.

The subject of the invention is thus, according to a first aspect, a method for marking an optical article, said method including at least one step of use of a marking machine on an optical article:

The marking machine being a marking machine that marks with an electromagnetic beam, preferably with a laser beam, said marking machine including an electromagnetic source, preferably a laser source, configured to emit a beam having a set radiation wavelength called the marking wavelength;

The optical article being an optical article including a substrate having a main face coated with an interference coating, said interference coating comprising at least two superposed layers called the interior layer and the exterior layer, the interior layer being located between the substrate and the exterior layer, the interference coating being such that it has a reflection coefficient Re in the visible domain (380-780 nm);

The use comprising irradiating at least the interior layer in a given spot called the marking spot, by means of the laser beam at the marking wavelength, so as to ablate, in the marking spot, the interior layer, over at least one portion of its thickness, and any layer located between the electromagnetic source and the interior layer; and being such that the ablated zone has a reflection coefficient Rm in the visible domain (380-780 nm), Rm being different from Re by at least 1%;

The interior layer absorbing the marking wavelength more greatly than any layer located between the electromagnetic source and the interior layer.

The subject of the invention is also, according to a second aspect, an optical article including a substrate coated with an interference coating comprising two superposed layers of materials, called the interior layer and the exterior layer, the interior layer being located between the substrate and the exterior layer, the interference coating being such that it has a reflection coefficient Re in the visible domain (380-780 nm);

Said article comprising a marking pattern on the surface of the interference coating, the marking pattern being formed by a plurality of substantially identical marking spots, each marking spot corresponding to the localized absence of the interior layer and of any layer located between said surface and the interior layer, the ablated zone having a reflection coefficient Rm in the visible domain (380-780 nm) such that Re is different from Rm by at least 1%, the marking pattern preferably being continuous. Preferably, such an optical article is obtained using the marking method according to the invention.

The invention is described in more detail below.

The method according to the invention therefore makes it possible to carry out, in a marking spot, a direct localized ablation of at least one portion of the interior layer and an indirect localized ablation of the layers located between the electromagnetic source and the interior layer.

The invention therefore advantageously allows the marking method, and in particular the depth of the engraving, to be controlled, this being very advantageous with respect to the methods of the prior art. Without wanting to be tied to any one theory, the applicant believes that this is mainly due to the fact that the electromagnetic beam succeeds in irradiating the interior layer, which, compared to the other layers present, is made of a material that is very absorbent at the wavelength of the radiation.

Specifically, according to the invention, each of the layers of material comprised between the electromagnetic source and the interior layer is at least partially transparent at the marking wavelength, i.e. it is at least partially non-absorbent at this marking wavelength. Preferably, this layer is a least semitransparent at this marking wavelength, i.e. it lets pass more than half of the energy of this marking wavelength.

Therefore, during the exposure to the electromagnetic beam, this interior layer receives most of the transmitted energy and is therefore selectively degraded. Given that the layers comprised between the interior layer and the electromagnetic source are generally oxide layers of very small thickness, the degradation, or even the sublimation of the interior layer, detaches these layers, which may then be removed.

Thus, the electromagnetic beam is advantageously intended to ablate the interior layer, and indirectly allows any layer located between the electromagnetic source and the interior layer, and therefore in particular the exterior layer, to be ablated, most often by debonding. In other words, the interior layer is (partially or completely) destroyed by the beam, the layers comprised between the beam and the interior layer being destroyed/removed via a collateral effect of the destruction of the interior layer.

The ablation is such that the single marking spot that results therefrom generally has a substantially cylindrical shape the axis of which lies substantially perpendicular to the surface of the interior layer that is furthest from the substrate before the latter interior layer is ablated.

It will be noted that when the invention is applied to an ophthalmic lens including an antireflection coating, not only do the values of reflection intensity differ between the ablated zone and the unablated zone, but in an additional embodiment, chroma, expressed in an L, a*, b* space, differs between the two zones. The unablated zone may thus have a pale green residual colour in reflection, for example for the lens including a Crizal Forte® coating, with a reflectance value of about 0.8%, and the ablated zone may have a colour in reflection that is rather pale blue.

More generally, the marking method according to the invention is advantageously such that the reflection at the marking spot has a colour, in saturation (hue: h*) and/or in hue (chrome: C*), that differs from that of the reflection of the unablated zone.

Thus, the contrast between the ablated zone and the unablated zone allowing the pattern to be observed, which is mainly based on a difference in reflection intensity, may be improved by a difference in colour in reflection. The optical article according to the invention is not necessarily a low-transmittance article such as a sunglass lens. It may also be almost transparent.

It will however be noted that the focal point of the laser beam is not necessarily located in the interior layer of the interference coating. It is even moreover more often outside of the latter, typically 1 to 2 mm outside of the latter, and for example 2 mm above the optical article. This is for example described in patent application WO 2015/040338 of the applicant.

By "element comprised between A and B", what is meant, unless otherwise specified, is that the element is located between A and B but is neither A nor B.

By "element comprised in an interval of A to B" or "element from A to B", what is meant, unless otherwise specified, is that the element is located between A and B and may be A or B. By "all of the elements counted from A to B", what is meant, unless otherwise specified, is the ensemble formed from A, from B and from any element located between A and B.

By "to irradiate", what is meant, according to the invention, is to expose to an electromagnetic beam. This leads to the removal of the material, i.e. of the material to be ablated. The irradiation is carried out according to the invention by means of the marking machine.

By "unablated zone", what is meant, according to the invention, is any portion of the main face that was not irradiated and that was therefore not ablated.

By "interference coating" (also called an interference filter or dichroic filter), what is meant, according to the invention, is any coating of at least two layers the indices and the thicknesses of which cause the reflection coefficient of a surface of the optical article to be attenuated and/or amplified via a constructive or destructive interference mechanism at all or some of the wavelengths comprised in the visible, i.e. in the interval (380 nm-780 nm). This reflection filter therefore consists of a succession of thin layers, the operating principle of which is based on the interference of successive reflections from each of the dioptric interfaces encountered. The interference may, depending on the thickness of the layers and the wavelength, be constructive or destructive. The portion that is not transmitted is reflected. In the case of antireflection coatings, the various reflections interfere in order to be greatly attenuated. In contrast, when all the reflections are in phase, mirror-like interference coatings having a very high reflectance are obtained.

An "antireflection coating" is defined as a coating, deposited at the surface of an optical article, that improves the antireflection properties of the article once ready for use. It makes it possible to reduce the reflection of light at the article-air interface over a relatively broad portion of the visible spectrum.

Antireflection coatings are well known in the art and particular examples are described in patent application US2008/0206470. The antireflection coating of the present invention may include any layer or coating of layers that improves the antireflection properties of the final optical article, over at least one portion of the visible spectrum, so as to increase the transmission of light and decrease the reflectance of the surface at the optical article-air interface.

As explained above, the invention also relates to a mirror-type interference coating.

The interference coating, whether it be an antireflection coating or not, of the optical article according to the invention includes the interference coating according to the invention such as defined above.

In particular, as understood in the invention, the "interference coating" does not comprise any anti-fouling and/or antifog and/or rain-repellent and/or hydrophobic and/or oleophobic and/or hydrophilic coating, such coatings generally having a thickness smaller than or equal to 2 nm and participating only negligibly in the attenuation or amplification of the reflection. Thus, every layer of the interference coating has an effect on the interference mechanism.

According to the invention, "interior" refers to the side closest to the substrate and "exterior" refers to the side furthest from the substrate. Therefore, what is meant by "interior layer" and "exterior layer", unless explicitly stated otherwise, is "the layer of the interference coating closest to the substrate among the layers of the interference coating" and "the layer of the interference coating" furthest from the substrate among the layers of the interference coating", respectively.

The "exterior layer" may be covered with an optional additional anti-fouling or rain-repellent or anti-fog layer, or even a temporary layer the role of which is to increase the adherence, for example for an edging step, and that is intended to be removed before the optical article is used by an end user. Such an additional layer is conventionally known as a top coat, and does not belong, as explained above, to the interference coating as understood in the invention.

By "the interior layer absorbing the marking wavelength more greatly than any layer located between the electromagnetic source and the interior layer", what is meant, according to the invention is that the absorption coefficient of the marking wavelength of the interior layer is higher than at least 10%, preferably than at least 20%, than the absorption coefficient at the marking wavelength of any other layer located between the electromagnetic source and the interior layer.

The "absorption coefficient" represents the absorption at a wavelength of the visible spectrum, and is defined, according to the invention, as the ratio between the absorbance A and the optical path L (=A/L) for an electromagnetic beam of given wavelength (here in the domain of the visible) in a given medium. This ratio is expressed in $m^{-1}$ or $cm^{-1}$, in particular according to standard ISO/CD 11551.

By "more greatly", what is meant, according to the invention, is in a way, which those skilled in the art will know how to define, suitable for achieving the aim targeted by the invention.

By "reflection coefficient" (Re or Rm according to the invention), what is meant, according to the invention, is the amount of light reflected by the surface of an optical article, illuminated by an illuminant covering at least all of the visible spectrum, for example the solar illuminant or illuminant D65. The amount of reflection is preferably measured with a ray of light incident on the surface with an angle of 2° or 10°. When not specified, the reflection coefficient takes into account only visible light, i.e. light having a wavelength comprised between 380 nm and 780 nm.

The "transmittance" $T_v$ (tau index v) corresponds to the light-flux fraction that passes through an optical article, as a function of wavelength, when illuminated with an illuminant covering at least all of the visible spectrum, for example the solar illuminant or illuminant D65. The transmittance $\tau_v$ corresponds to a standardized international definition (standard ISO 13966:1998) and is measured according to standard ISO 8980-3. It is defined in the wavelength range from 380 to 780 nm.

By "transparent" what is meant, according to the invention, is nonabsorbent at a wavelength in the visible [380-700 nm], i.e., in other words, that an image observed through the product qualified transparent is perceived without significant loss of contrast or of quality.

The interior layer is the layer of the interference coating closest to the substrate. It is located between the substrate and the exterior layer of the interference coating, but it does not necessarily make contact with the substrate or with the exterior layer. Thus, one or more layers of one or more intermediate coatings may be placed between the substrate and the interior layer, and between the interior layer and the exterior layer. In addition, the interior layer does not necessarily completely cover the substrate although, preferably, said layer covers said substrate.

Any optional layer located between the substrate and the interior layer is at least partially transparent at the marking wavelength, i.e. it is at least partially non-absorbent at this marking wavelength. Preferably, this layer is a least semi-transparent at this marking wavelength, i.e. it lets pass more than half of the energy of this marking wavelength.

Likewise, the exterior layer does not necessarily make contact with the interior layer. Furthermore, one or more additional layers may be placed above the exterior layer, as indicated above. In other words, the exterior layer is not necessarily the layer of the optical article that is furthest from the substrate. These additional layers are for example temporary layers used in the context of the manufacture but that are not intended to be present on the optical article that will be used by an end user. It may for example, in the case of ophthalmic lenses, be a coating used to allow the lenses to be edged to the shape of a frame, said additional layers being removed after this shaping operation.

Although the optical article according to the invention may be any type of article, such as a screen, a glazing unit, a protective eyeglass especially usable in a working environment, or a mirror, it is preferably an ophthalmic lens and even more preferably an ophthalmic lens for a pair of spectacles, or a blank ophthalmic lens such as a semi-finished optical lens, and in particular a spectacle glass. The lens may be a clear, polarized or tinted lens or a photochromic lens or be joined to an active element such as an augmented reality device, or an electrochromic or electro-focal device. The lens may be a lens without optical power, with a simple or complex optical power, or even a progressive or bi- or multi-focal lens.

An optical article generally possesses, on the side of the external layer furthest from the substrate, an interference coating, preferably an antireflection coating, such as is known to those skilled in the art, so as to prevent the formation of parasitic reflexes that might otherwise irritate the wearer of the ophthalmic lens and anyone conversing therewith. It is this interference coating that is marked by the marking method according to the invention.

Thus, typically, an ophthalmic lens is most often provided with a mono- or multi-layer antireflection coating that is generally made of mineral material. Such an interference coating may, nonlimitingly, be an antireflection coating, a reflective (mirror-like) coating, an infrared filter or an ultraviolet filter or an interference coating working as an antireflection coating in a portion of the luminous spectrum and working as a partial mirror in the vicinity of one or more wavelength ranges, and is preferably an antireflection coating.

The substrate is transparent to the wavelengths of the visible [380-780 nm], and has front and back main faces.

The substrate according to the invention is preferably an organic lens, for example made of thermoplastic or thermosetting plastic. Before the interference coating is deposited on the substrate, which is optionally coated, for example with an at least one anti-abrasion and/or anti-scratch coating layer, it is common to subject the surface of said optionally coated substrate to a physico-chemical activation treatment intended to increase the adhesion of the interference coating.

The interference coating according to the invention may be present on the surface of at least one of the main faces of the bare, i.e. uncoated, substrate, or on at least one of the main faces of a substrate already coated with at least one functional coating layer. However, it may also be present on the surface of both of the main faces of the substrate of the optical article.

By "functional coating", what is meant, according to the invention, is at least one coating chosen from a non-exhaustive list comprising anti-scratch coatings, anti-shock coatings or coatings that improve adhesion, tinted coatings, antistatic (inter alia) coatings, films or coatings performing a polarization function or a photochromic function, or indeed structures enabling an active function, for example an electrochromic function.

As is well known, the interference coatings, preferably the antireflection coatings, are conventionally multilayer coatings usually comprising high-refractive-index (HI) layers and low-refractive-index (LI) layers.

HI layers are well known in the art. They generally comprise one or more mineral oxides, such as, without limitation, zirconia ($ZrO_2$), titanium oxide ($TiO_2$), tantalum pentoxide ($Ta_2O_5$), neodymium oxide ($Nd_2O_5$), hafnium oxide ($HfO_2$), praseodymium oxide ($PrTiO_3$), $La_2O_3$, $Nb_2O_5$, $Y_2O_3$, indium oxide $In_2O_3$ or tin oxide $SnO_2$. The preferred materials are $TiO_2$, $Ta_2O_5$, $PrTiO_3$, $ZrO_2$, $SnO_2$, $In_2O_3$ and mixtures thereof.

LI layers are also well known and may comprise, without limitation, $SiO_2$, $MgF_2$, $SrF_4$, alumina ($Al_2O_3$) in a low proportion, $AlF_3$, and mixtures thereof, preferably $SiO_2$.

At least one of these layers may be electrically conductive. This thus allows the optical article to be made antistatic. By "antistatic", what is meant is the property of not retaining and/or developing an appreciable electrostatic charge. An optical article is generally considered as having acceptable antistatic properties when it does not attract or hold dust and small particles after one of these surfaces has been rubbed with an suitable cloth. The electrically conductive layer may be located in various places in the interference coating, provided that the interference properties of the optical article, the antireflection properties for example, are not adversely affected thereby. It must be sufficiently thin not to negatively affect the quasi-transparency of the interference coating. Generally, its thickness varies between 0 and 100 nm, preferably in an interval of 2 to 25 nm and even more preferably in an interval of 4 to 15 nm. The electrically conductive layer, which forms part of the interference coating, preferably comprises a metal oxide chosen from indium oxide, tin oxide, zinc oxide and their mixtures. Indium tin oxide (tin-doped indium oxide, $In_2O_3$:Sn), indium oxide ($In_2O_3$), and tin oxide $SnO_2$ are preferred.

For example, French patent application FR 2943798 of the applicant describes an optical article with antistatic and antireflection or reflective properties, comprising a substrate having at least one main face coated with an antireflection or reflective coating, said coating comprising at least one electrically conductive layer based on tin oxide, i.e. comprising at least 30% by weight tin oxide with respect to the total weight of the electrically conductive layer. Such an optical article may advantageously be marked with the marking method according to the invention, the electrically conductive layer being particularly suited to being the interior layer according to the invention at certain marking wavelengths.

The interference coating may also include a sublayer (i.e. a coating of relatively large thickness) with the aim of improving the abrasion resistance and/or scratch resistance of said coating and/or to promote its adhesion to the substrate or to the subjacent coating. Such a sublayer, which forms part of the interference coating, generally has a thickness of 100 to 200 nm. It is generally exclusively mineral in nature and for example consists of silicon dioxide $SiO_2$.

Generally, a HI layer has a thickness of 10 to 120 nm and an LI layer has a thickness of 10 to 100 nm.

Preferably, according to the invention, the total thickness of the interference coating is less than 1 µm, better still less than or equal to 780 nm and better still less than or equal to 500 nm. The total thickness of the interference coating is generally greater than 100 nm, preferably greater than 150 nm.

The marking machine is for example such as described in patent application WO 2015/040338 of the applicant, which most particularly describes the use of Nd-YAG laser at application wavelengths of 230 to 290 nm and preferably of about 266 nm.

For example, an Nd-YAG laser may be used, according to the invention, at 266 nm with pulses of 1 ns, an energy per pulse of 3 µJ and a marking-spot area of 10 µm diameter.

Parameterising the marking laser in this way advantageously allows an $SnO_2$ layer of to be targeted and the $SnO_2$ layer to be at least partially removed when irradiated, without passing through the substrate, but also to remove, during the ablation of the portion of the $SnO_2$ layer, the one or more layers present above the $SnO_2$ layer. This will be demonstrated in the examples below.

In the case where the interference coating is an antireflection coating, its reflection coefficient Re is preferably lower than 1.4% and even more preferably lower than 0.85%.

The marking method according to the invention advantageously makes it possible to obtain a marking pattern that is very visible to an exterior observer and not very, and preferably not at all, visible to the wearer of the optical article. In practice, 2% of difference in reflection coefficient between Re and Rm (Rm−Re=0.02) corresponds to a local increase in the reflex of about 200 to 300% depending on the reflection angle, the perceived increase in the reflection being as follows: (Rm−Re)/Re.

In the case where the interference coating is an antireflection coating, the perceived increase in the reflection is for example about 0.02/0.0085 [i.e. (Rm−Re)/Re], i.e. 235%.

Preferably, according to the invention, the difference between Rm and Re is, in absolute value, higher than 3% and even more preferably higher than 5% (in amount with respect to light of given incidence). In general, the difference between Rm and Re is smaller than 50% of the reflection coefficient Re, except when the interference coating is a mirror-like coating.

According to one embodiment, the difference between Rm and Re is, in absolute value, comprised between 5% and 25% and preferably between 7% and 20%.

According to one embodiment of the invention, the irradiating step is followed by a cleaning step in order to remove any trace of the layers ablated in the irradiating step.

According to one preferred embodiment of the invention, the electromagnetic beam is emitted in pulses, and the energy per pulse is comprised in an interval 0.1 to 10 µJ and for example equal to 0.5 µJ, 1 µJ, 2 µJ or 5 µJ and preferably comprised in an interval 0.1 to 3 µJ and for example equal to 0.5 µJ, 1 µJ, 2 µJ or 3 µJ.

Preferably, the irradiating step is carried out by emitting a focused beam of pulsed ultraviolet laser radiation having at least the following parameters:
- a radiation wavelength comprised in an interval of 200 to 400 nm and preferably of 200 to 300 nm,
- a pulse duration comprised in an interval of 0.5 to 5 ns, and
- an energy per pulse comprised in an interval of 0.1 to 10 µJ and preferably comprised in an interval of 0.5 to 3 µJ,
- and, in the marking spot, a beam diameter comprised in an interval of 5 to 50 µm.

In one preferred embodiment of the invention, when the radiation wavelength of the beam of pulsed ultraviolet laser radiation performing the irradiating step is comprised in an interval of 200 to 300 nm, the interior layer is based on, and preferably essentially consists of, tin, preferably tin oxide and even more preferably tin dioxide $SnO_2$.

"Based on" is understood, according to the invention, to mean that the interior layer comprises at least 50% by weight of the compound with respect to the total weight of the interior layer.

"Essentially consists" is understood, according to the invention, to mean that the proportion of the compound in said interior layer is larger than or equal to one of the following values: 70%, 75%, 80%, 90%, 95%, 97%, 99%, 99.5%, 99.9%, 99.95%. Ideally, said interior layer consists of a layer of tin dioxide $SnO_2$.

The inventors have in particular noted that layers based on tin, in particular tin oxide and most particularly tin dioxide, selectively react during an irradiation by means of a laser beam having a wavelength comprised between 200 and 300 nm, when said layers are present in an interference coating that otherwise includes only layers based on silica or zirconia. In this configuration, the layers based on silica or zirconia are substantially transparent to the wavelength whereas the layers based on tin absorb energy at this wavelength in a sufficient amount to generate a local destruction, or even ablation, of this layer, over at least one portion of its thickness.

The interior layer may contain other constituents, in particular metal oxides, in particular electrically conductive metal oxides that are preferably transparent. It may in particular comprise titanium oxide and/or zinc oxide. Preferably, the interior layer contains no indium, either in oxide form or in any other form.

Preferably, the interior layer has a thickness comprised in an interval of 1 to 100 nm, preferably of 2 to 25 nm and even more preferably of 4 to 15 nm, the sum of the thicknesses of the interior layer and of the exterior layer being comprised between 5 and 300 nm and preferably between 45 and 175 nm.

The exterior layer is generally based on, and preferably consists essentially of, silicon, preferably silicon oxide and even more preferably silicon dioxide $SiO_2$.

According to one particular embodiment of the invention, the transmittance in the visible of the optionally coated interference coating and the transmittance in the visible of all of the layers counted from the substrate to the exterior layer are substantially identical. This is generally achieved because the absorbance, in the visible, is substantially identical (i.e. to within 0.1 or 0.2%) whether the ablated layers are present or not. Thus, generally, the difference between the amount of light transmitted by the ablated zone (i.e. the marked zone comprising at least one marking spot or even a marking pattern produced by the marking method according to the invention) and the unablated zone (or unmarked zone, i.e. the zone not comprising such a marking pattern) mainly depends, to the first order, on the difference between the reflectance of these zones. For a clear ophthalmic lens including an antireflection coating, the amount of visible light transmitted is generally larger than 85%, or even than 90% or even than 95%. In particular, the transmittance, in the visible, of the interference coating is close to (0.99−Rm), where Rm is the reflection coefficient of this coating. In this case, a difference comprised between 1% and 8% in the reflectance of the two zones causes the amount of light passing through the interference coating in the ablated zone to be comprised between 0.92 times and 0.99 times the amount of light passing through the coating in the unablated zone. It is this small difference that makes the marking pattern not very or even not at all visible to the wearer.

According to one preferred embodiment of the invention, at least one absorbent layer (i.e. a layer that at least partially absorbs visible light) is present in the interference coating of the invention, and is locally removed, directly or indirectly, during the ablation of the interior layer by the electromagnetic beam. In this case, preferably, all the layers counted from the interior layer to the exterior layer together absorb at least 0.5% of the transmitted visible light, for example at least 1% of the transmitted light, and, preferably, the absorbent layer has an absorption ("Abs") (or in other words an absorption coefficient) comprised in an interval of 0.5 to 1.5 times and preferably 0.9 to 1.1 times the absolute value of the difference between Re and Rm. This is achieved via the parameters that are the thickness and absorption coefficient of the absorbent layer.

The absorbent layer is a layer of the interference coating and participates in the reflection properties of the interference coating. It may be the interior layer, the exterior layer or another layer position between these two layers.

According to this embodiment, the amount of light transmitted through the interference coating no longer only depends on the reflection coefficient of the interference coating, but also on the intrinsic absorption of the absorbent layer. Thus, the amount of light transmitted through the interference coating in the unablated zone corresponds to about [1−Re−Abs] where Abs represents the absorption of the light by the absorbent layer. By way of comparison, the amount of light transmitted through the interference coating in the ablated zone, in which the absorbent layer has been locally removed (directly or indirectly) during the irradiation, corresponds to about [1−Rm]. Specifically, the absorption of the layers of the interference coating other than the absorbent layer is considered to be zero to the first order.

Thus, the difference between the reflectance of the two zones remains [Re−Rm]; in contrast, the difference between the amount of light transmitted by the two zones is then [Rm−Re−Abs].

In contrast, the difference between the amount of light transmitted by the ablated zone and by the unablated zone is decreased. It is preferably comprised between −0.5×(Rm−Re) and 0.5×(Rm−Re), (Rm−Re) being understood to represent the absolute value of the difference between Re and Rm. This value depends on the value of the absorption of the absorbent layer. In such a case, perception in transmission of the ablated zone, by the spectacle wearer, is decreased at least by half.

In one particular case, the thickness and absorption coefficient of the absorbent layer are determined in order that the absorption of light by the absorbent layer is close to the reflectance difference and is comprised between 0.9 and 1.1 times the absolute value of (Re-Rm). In this case, it is possible to consider the ablated zone to be invisible in transmission.

According to one embodiment of the invention, the interference coating is an antireflection coating. In this case, the antireflection coating preferably comprises, from the surface of the optionally coated substrate to the exterior, a layer of $ZrO_2$, of 5 to 40 nm thickness, a layer of $SiO_2$, of 10 to 55 nm thickness, a layer of $ZrO_2$, of 20 to 150 nm thickness, an interior layer of $SnO_2$, of 4 to 15 nm thickness, and an exterior layer of $SiO_2$, of 50 to 120 nm thickness.

In one embodiment of the invention, the interference coating is itself coated (on the face furthest from the substrate) with a coating of protective material, such as a rain-repellent coating, an anti-fog coating and/or an anti-fouling coating, said marking method then generally being followed, in this case, by a deprotecting step carried out subsequent to said marking method, said deprotecting step comprising removing this coating of protective material.

According to one particular embodiment according to the invention, the irradiating step is carried out in as many marking spots as necessary so as to locally mark a region of the main surface of the substrate of the optical article by means of multiple marking spots, said region forming a predefined pattern called the marking pattern. In such a case, there is preferably a continuity between the marking spots that define the region forming the marking pattern. Such a marking region preferably includes less than 1% per unit area of residues from the ablated layers (i.e. the layers ablated by direct or indirect irradiation). Such a finish may be obtained directly after the marking method, or indeed require an additional step of brushing and removal, which those skilled in the art will be able to perform. This is notably and advantageously different from prior-art embodiments.

In such a case, preferably, the marking is carried out with a pitch of dimension smaller than or equal to the dimensions of the marking spot, i.e. smaller than or equal to the average diameter of a zone ablated in a single marking spot, so that the marking spots exhibit a partial overlap. For example, the pitch of the marking is comprised between 0.5 and 1 times the marking diameter of a pulse of the beam when the beam is emitted in pulses. If the pulse is reproduced identically each time by the electromagnetic source, one particular embodiment is such that the marking pitch is equal to the marking diameter. This most particularly and advantageously makes it possible to be able, according to the invention, to carry out a continuous marking method that consumes the least possible electromagnetic energy. This is most particularly effective when the electromagnetic beam is emitted in pulses, and has an energy per pulse comprised in an interval of 0.1 to 3 µJ and for example equal to 0.5 µJ, 1 µJ, 2 µJ or 3 µJ.

By "pitch", what is meant, according to the invention, is the minimum distance between the centres of two successively produced marking spots.

Preferably, a single pulse is required per marking spot.

The invention also relates to an optical article including a substrate having a main face coated with a multilayer interference coating, said interference coating comprising at least two superposed layers of materials called the interior layer and exterior layer, the interior layer being located between the substrate and the exterior layer, said article comprising a marking pattern on the surface of the interference coating, the marking pattern being formed by a plurality of substantially identical marking spots, each marking spot corresponding to the localized absence of at least one portion of the thickness of the interior layer and of the entirety of any layer located between said surface and the interior layer, the marking pattern preferably being continuous.

Preferably, such an optical article is obtained by the marking method according to the invention, in which method the irradiating step is repeated a plurality of times.

The marking zone is formed from a plurality of marking spots, each marking spot being obtained by irradiation so as to achieve, with an electromagnetic beam, ablation of at least one portion of the thickness of the interior layer.

By "on the surface of the interference coating" what is meant is on the surface of the interference coating if said coating is not itself coated with at least one coating layer and on the surface of the coating layer the furthest from the substrate if said coating is itself coated with at least one coating layer.

By "continuous marking pattern", what is meant, according to the invention, is that any marking pattern is formed from multiple contiguous marking spots, the pitch between two contiguous marking spots being of dimensions smaller than or equal to the smallest of the dimension of these two marking spots.

The characteristics of the interference coating, in particular of the interior and exterior layers, are such as described above for the marking method according to the invention.

Preferably, the optical article according to the invention does not absorb in the visible or absorbs little in the visible. In the present patent application, this is understood to mean that its transmittance $\tau_v$ in the visible, also called the relative transmittance in the visible, is higher than 90%, preferably higher than 95%, more preferably higher than 97% and even more preferably higher than 99%.

Particularly preferable, the light absorption of the optical article according to the invention is lower than or equal to 1.

Alternatively, the optical article may be a tinted so-called sunglass lens, for example having a transmittance comprised between 5% and 50% depending on its classification on the international scale of classification of sunglasses.

The invention will be better understood in light of the appended drawings, in which:

FIGS. 6 to 9 schematically show a second embodiment of the marking method according to the invention, FIGS. 6 and 7 showing the ophthalmic lens before the marking method is performed and FIGS. 8 and 9 showing the ophthalmic lens after the marking method has been performed; more precisely.

The invention will be better understood in light of the following example embodiments, if reference is made to the appended drawings as indicated above. FIGS. 1 to 9 are described in more detail in the following examples.

EXAMPLES

The following examples illustrate the invention without however limiting its scope.

In the two following example embodiments, the interior layer is made from tin dioxide $SnO_2$; the exterior layer is made from silicon oxide, namely either silicon monoxide SiO, or silicon dioxide $SiO_2$; and the electromagnetic beam is a 266 nm (UV) laser beam. The marking wavelength is therefore 266 nm.

Example 1: Marking of an Ophthalmic Lens Consisting of a Substrate, of a First Layer of Chromium ("Cr1"), of an $SnO_2$ Interior Layer, of an Absorbent Second Layer of Chromium ("Cr2"), and of an $SiO_2$ Exterior Layer The ophthalmic lens (1) consists of a substrate (6) on which are superposed, in succession, a first metal layer (5) (of chromium, "Cr1"), an interior layer (4) of tin dioxide $SnO_2$, a second metal layer (3) (of chromium, "Cr2") or absorbing layer, and an exterior layer (2) of silicon monoxide SiO. The substrate (6) is here a polarized or tinted substrate including an anti-scratch coating of trademark Mithril®.

Such a substrate-metal-dielectric-metal-dielectric structure is to similar to that of the lens marked in the prior art US 2004/0095645, with the exception that, according to the invention, an $SnO_2$ layer has been added between the layer Cr1 and the layer Cr2.

Layers (2) SiO, (3) Cr2, (4) $SnO_2$ and (5) Cr1 are of nature and have a thickness such that the coating that they form creates an interference effect that increases reflexes so as to create a mirror with reflection. This coating has an average reflection coefficient of about 12 to 15%, the reflection being greatest in the violet.

The layer (5) of chromium Cr2, which is very slightly absorbent in the visible, substantially decreases the overall transmittance of the system, this posing no problem in the case of the used ophthalmic lens (1), which is here a sunglass lens.

The nature and physical and optical characteristics of the layers are indicated in the following table:

| Number of the layer counted starting from the substrate/ Layer reference (illustration) | Material of the layer | Thickness of the layer (±2 nm) |
| --- | --- | --- |
| 1/(5) | Cr | 15 nm |
| 2/(4) | $SnO_2$ | 6 nm |
| 3/(3) | Cr | 5 nm |
| 4/(2) | SiO | 65 nm |

The marking process according to the invention has been carried out by means of a pulsed laser emitting a beam at a wavelength of 266 nm with pulses of 1 ns duration, an energy per pulse of 3 µJ and a marking-spot area of about 10 µm diameter.

Figure 1:
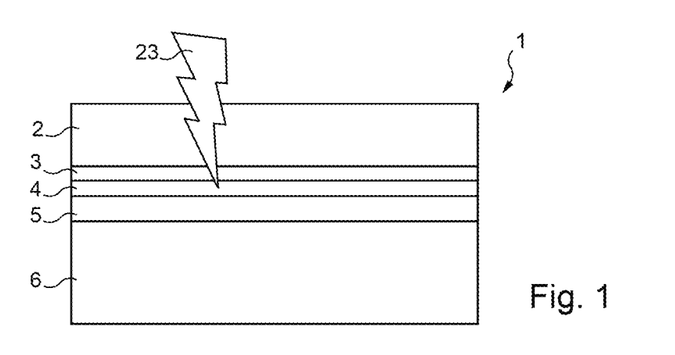
FIGS. 1 to 3 schematically show a first embodiment of the marking method according to the invention, FIG. 1 schematically showing, in cross section, the principle of the marking method before its performance, FIG. 2 schematically showing, in cross section, the marking method in the process of being performed, and FIG. 3 schematically showing, in cross section, the marking method at the end of its performance.
Figure 2:
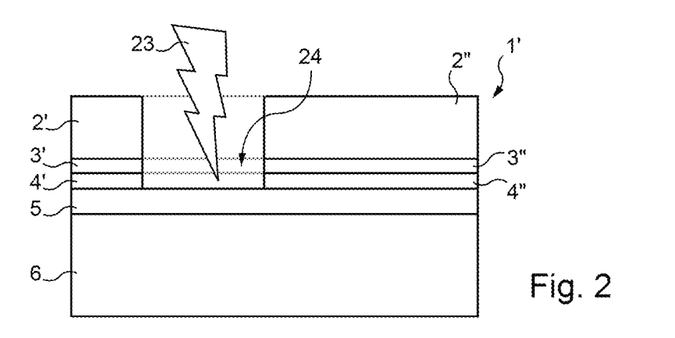
Figure 3:
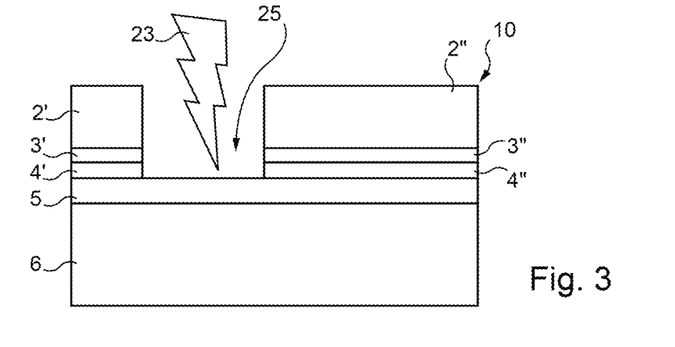

FIGS. 1 to 3 schematically illustrate this first example embodiment of the marking method according to the invention. The laser beam 23 is shown very symbolically by a lightning bolt that is focused on the interior layer 4.

FIG. 1 schematically shows, in cross section, the principle of the marking method before it is performed on the ophthalmic lens 1. In this figure the following may be seen: the substrate (6), on which the first layer (5) of chromium Cr1 has been deposited, and the interior layer (4) of tin oxide $SnO_2$, then the layer (3) of chromium Cr2, and lastly the exterior layer (2) of silicon monoxide SiO, the latter three being superposed on said first layer.

FIG. 2 schematically shows, in cross section, the marking method in the process of being performed by local removal of the layers (4), (3) and (2) with the electromagnetic beam (23), which irradiates the interior layer (4) made of $SnO_2$ and destroys it, the layers (3) and (2) indirectly being removed during the destruction of the layer (4). The portion (24) of the layers (4), (3) and (2) in the process of removal, which portion will become the marking spot (25) of FIG. 3, may be seen. In this cross section, the layer (4) is divided into two portions (4') and (4"), the layer (3) is divided into two portions (3') and (3") and the layer (2) is divided into two portions (2') and (2"). The ophthalmic lens (1') on which the marking is begun also comprises the layer (5) on the substrate (6).

FIG. 3 schematically shows, in cross section, the marking method at the end of performance thereof. In this cross section, layers (4), (3) and (2) have been ablated following irradiation with the electromagnetic beam (23), dividing them into two portions (4') and (4"), into two portions (3') and (3") and into two portions (2') and (2"), respectively. An engraved ophthalmic lens (10) is thus obtained.

The embodiment performed as illustrated has allowed a marking spot (25) to be produced. Repetition of the irradiating step of the method of the invention allows a plurality of marking spots forming a marking pattern, such as a logo, to be produced.

Advantageously, the layer (5) of chromium Cr1, which layer is comprised between the interior layer (4) and the substrate, absorbs only little or even very little of the light emitted at the wavelength of the laser (260 nm), this making it practically insensitive to the marking electromagnetic beam. It is therefore not destroyed by irradiation by the marking electromagnetic beam. It is therefore possible to superpose the marking spots without running the risk of over-engraving in the overlap between two marking spots. Therefore, the method according to the invention advantageously allows a continuous marking to be produced on the surface of the ophthalmic lens (1), i.e. a marking such as a logo of large area, that is uniform i.e. not "dotted".

In contrast, prior-art technologies that aimed to create residue-free markings by laser ablation needed to produce marking spots that were partially superposed, this implying, with respect to the rest of the pattern, deeper over-engraving locally in two contiguous marking spots, this for example causing local ablation of at least one additional layer, i.e. the layer (5) Cr1.

Figure 4:
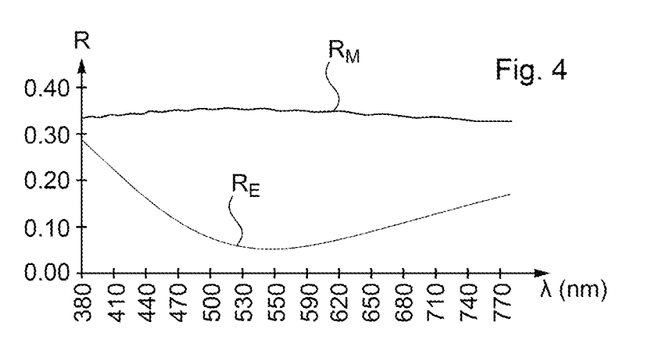
FIGS. 4 and 5 illustrate the results obtained in reflection (R) and in transmission (T) for the ophthalmic lens (1) obtained according to the first embodiment of FIGS. 1 to 3 in the zone of the marking spot (25) and in other zones of the surface of the ophthalmic lens.

FIG. 4 illustrates the results obtained in reflection (R) for the ophthalmic lens (1) obtained according to the first embodiment of FIGS. 1 to 3 in the ablated zone of the marking spot (25): $R_m$ and in the unablated zone of the surface of the ophthalmic lens (1): $R_e$.

It may be seen that the interference coating (2, 3, 4, 5) is characterized by a specific reflectance spectrum $R_e$, illustrated in FIG. 4, and that, in the unablated zone, the average reflectance spectrum Ref2, which is of about 12 to 15%, reflects slightly more in the violet. It may also be seen that the layer (5) Cr1, alone, present on the anti-scratch material, causes the lens to have locally a reflection coefficient Ref1 that is about 33% (this being higher than Ref2), and that is relatively uniform in wavelengths in the visible.

Thus, when the ophthalmic lens (1) is observed, the observer perceives an additional reflection in the zone of the marking, that contrasts with the reflection of surrounding points.

The difference in reflection coefficient between the marking spot (25) and the other (unablated) zones of the surface of the ophthalmic lens (1) is therefore about 18% on average, thereby allowing patterns to be formed via a difference in intensity in reflection but also in hue and in chroma in reflection from the surface of the ophthalmic lens. Specifically, there is a factor of as much as about two and a half, at the central wavelengths of the spectrum of the visible, between the reflection coefficient $R_m$ of the pattern formed by the ablated zone of the marking spot (25) and the reflection coefficient of the unablated zone of the surface of the ophthalmic lens (1).

This variation in hue and in chroma may also be achieved by means of the invention with interference coatings other than that of example 1.

Moreover, as will be clear from the above data, the hue of the reflex and the intensity of this hue varies between the ablated zone of the marking spot (25) and the unablated zone of the surface of the ophthalmic lens (1). The marking spot (25) has a substantially uniform reflectance over the spectrum of visible light, this giving a substantially white reflex, or in any case a reflex with a low hue intensity. In contrast, the unablated zone of the surface of the ophthalmic lens (1) more particularly reflects the violet, giving the ophthalmic lens (1) a hue that is rather violet on the whole.

Preferably, the absorbance A2 of the layer (3) Cr2 in the visible is such that the following equation is respected or approached: Ref2+A2=Ref1. In this case, the transmittance of the light passing through the ophthalmic lens (1) in the ablated zone of the marking spot (25) is substantially identical to the transmittance outside of the marking, in the unablated zone of the surface of the ophthalmic lens (1). This makes it possible for the ophthalmic-lens wearer to practically not perceive the difference, or even to perceive no difference, in transmittance level with the marking spot (25). The latter is therefore visible to an exterior observer and not visible to the wearer of the ophthalmic lens (1).

Thus, according to this example embodiment, the absorbance, in the visible (380-780 nm) of the layer (3) Cr2 is such that it is equivalent to the decrease in the effectiveness of the interference coating devoid of the layers (2) $SiO_2$, (3) Cr2, and (4) $SnO_2$.

Figure 5:
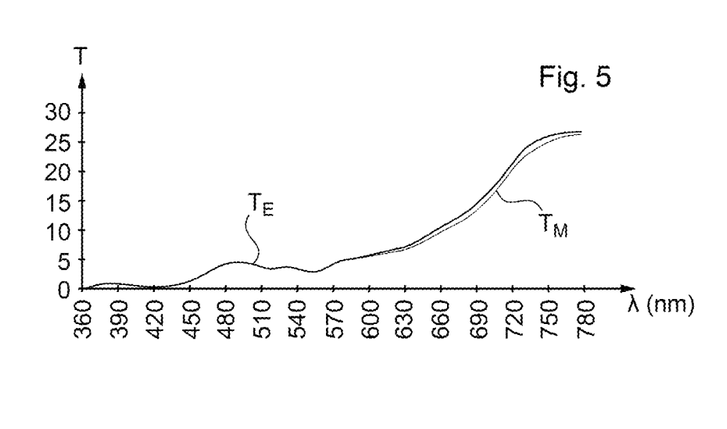

FIG. 5 illustrates the transmittance (T) measured as a function of wavelength through the ophthalmic lens (1) obtained according to the first example embodiment of FIGS. 1 to 3 in the zone of the marking spot (25): $T_m$ and in the unablated zone of the surface of the ophthalmic lens (1): $T_e$.

It may be seen that, during the ablation of at least one portion of the thickness of the interior layer (4), the layer (3) Cr2 is also removed and no longer participates, in the ablated zone of the marking spot (25), in the absorption of light. Therefore, as may be deduced from the curve of FIG. 5, the transmittance is substantially identical in the ablated zone of the marking spot (25) (curve $T_m$) and in the unablated zone of the surface of the ophthalmic lens (1) (curve $T_e$).

Thus, the decrease in the amount of light passing through the ophthalmic lens (1) caused by the absorption of the chromium layer (3) Cr2 in the unablated zone of the surface of the ophthalmic lens (1) is approximately equivalent to the decrease in the amount of light passing through the ophthalmic lens (1) caused by the presence of a higher reflection coefficient in the ablated zone of the marking spot (25).

Various variants of this first example embodiment may be envisioned, all of which are within the ability of a person skilled in the art to implement. Certain of these variants are described below.

Thus, the layer (5) Cr1 may be replaced by a coating of layers each having the property of not absorbing the marking wavelength too greatly.

Likewise, the layer (2) of SiO and the layer (3) of Cr2 may be replaced by another coating of similar layers.

Lastly, it is possible for the layer (3) Cr2 not to be absorbent, even slightly, in the visible (380-700 nm), or to not be present at all. This is particularly the case when the interior layer (4) is itself chosen to be made of a material that is absorbent in the wavelength range of the visible.

Example 2: Marking of an Opthalmic Lens Consisting of a Substrate, of a Layer of $ZrO_2$, of a Layer of $SiO_2$, of a Layer of $ZrO_2$, of an Interior Layer of $SnO_2$, of an Exterior Layer of $SiO_2$, of a Layer of an Antifouling Agent and of a Double Temporary Layer The ophthalmic lens (20) consists of a substrate (21) that is a lens of 1.5 index from Essilor International® including an anti-scratch coating of trademark Mithril®, on which is superposed an interference coating consisting of a coating including, successively, starting from the varnish present on the substrate, a first layer (18) of zirconium oxide $ZrO_2$, a first layer (17) of silicon dioxide $SiO_2$, a second layer (16) of zirconium dioxide $ZrO_2$, a layer (15) of tin dioxide $SnO_2$ or interior layer, a second layer (14) of silicon dioxide $SiO_2$ or exterior layer, a (hydrophobic and/or oleophobic) antifouling layer (13), a layer (12) of magnesium difluoride $MgF_2$ of 37 nm thickness and a layer (11) of magnesium oxide MgO of a few nanometres thickness.

Layers (14, 15, 16, 17 and 18) together, ignoring the respective layers 12 and 11 of $MgF_2$ and MgO, which are temporary layers, form an interference coating that is here an antireflection coating, the thicknesses of the layers being calculated by means of a software package known to those skilled in the art (which takes into consideration the nature of these layers) in order to achieve a total reflection coefficient (Re) lower than 1%, for example 0.7 or 0.8% depending on the samples measured.

The nature and physical and optical characteristics of the layers of the interference coating are indicated in the following table:

| Number of the layer counted starting from the substrate/ Layer reference (illustration) | Material of the layer | Refractive index of the layer | Thickness of the layer (±3 nm) |
| --- | --- | --- | --- |
| 1/(18) | $ZrO_2$ | 2.0038 | 30 nm |
| 2/(17) | $SiO_2$ | 1.4741 | 40 nm |
| 3/(16) | $ZrO_2$ | 2.0038 | 60 nm |

| Number of the layer counted starting from the substrate/ Layer reference (illustration) | Material of the layer | Refractive index of the layer | Thickness of the layer (±3 nm) |
|---|---|---|---|
| 4/(15) | SnO$_2$ | 1.8432 | 6 nm |
| 5/(14) | SiO$_2$ | 1.4741 | 110 nm |

Performing the method according to the invention causes a local ablation of the exterior SiO$_2$ layer 14, of the layers 13, 12 and 11, which are outside the exterior layer SiO$_2$, and an at least partial ablation of the interior layer 15, which is made of SnO$_2$. In this marking spot (P), the value of the reflectance (Rm) measured in the ablated zone is about 8.5%, or about 10 times more than Re.

FIGS. 6 to 9 schematically illustrate this second example embodiment of the marking method according to the invention.

Figure 6:
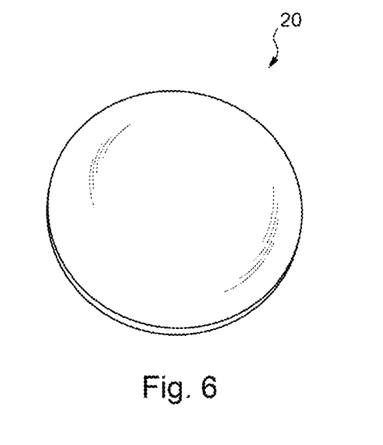
FIG. 6 shows an overview of the ophthalmic lens before the marking method is performed.
Figure 7:
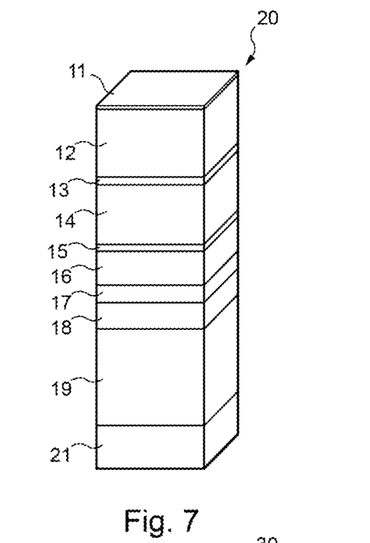
FIG. 7 shows, in perspective, a section of the layers present on the ophthalmic lens before the marking method is performed.
Figures 8, 9:
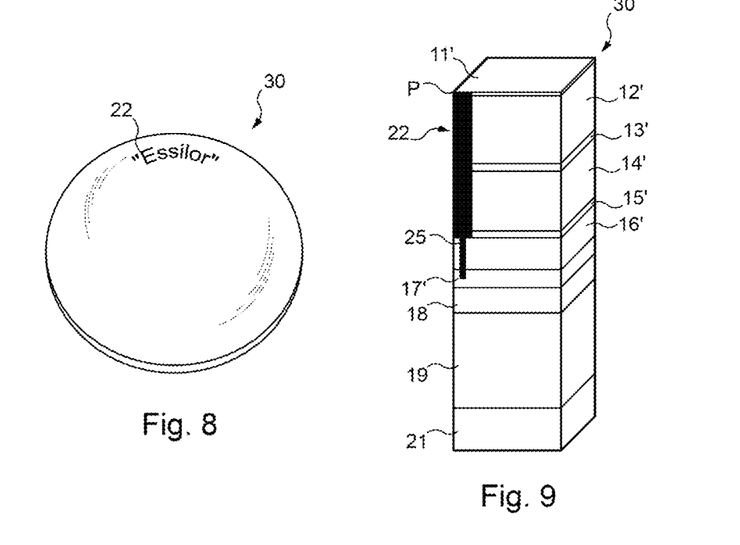
FIG. 8 shows an overview of the ophthalmic lens after the marking method has been performed.
FIG. 9 shows, in perspective, a section of the layers present on the ophthalmic lens after the marking method has been performed.

FIGS. 6 and 7 show the ophthalmic lens before the marking method is performed and FIGS. 8 and 9 show the ophthalmic lens after the marking method has been performed.

FIG. 6 schematically shows an overview of the ophthalmic lens (20) before the marking method is performed.

FIG. 8 schematically shows an overview of the ophthalmic lens (30) after the marking method has been performed. The marking-pattern engraving or marking (22) forming the word "Essilor" may be seen therein.

FIG. 7 schematically shows in perspective a section of the layers present on the ophthalmic lens (20), before the marking method is performed.

In this figure the substrate (21) may be seen, on which has been deposited in succession a "UL" UV filtering layer (19), a first layer (18) of ZrO$_2$, a first layer (17) of SiO$_2$, a second layer (16) of ZrO$_2$, an interior layer (15) of SnO$_2$, an exterior second layer (14) of SiO$_2$, an antifouling coating layer (13), a layer (12) of MgF$_2$ and a layer (11) of MgO.

FIG. 9 schematically shows in perspective a section of the layers present on the ophthalmic lens (20) after the marking method has been performed.

The layers (11), (12), (13), (14) and (15) have been ablated in a marking spot (P) (here schematically shown in two dimensions whereas, in fact, as explained above, it is substantially a cylinder that, by repetition of the irradiating step of the method of the invention, forms part of the marking (22), this having led to the layers (11'), (12'), (13), (14) and (15) being obtained. An engraved ophthalmic lens (30) is thus obtained.

In practice, at the bottom of the marking spot (P), a slight marking (25) (here shown schematically in two dimensions whereas in fact it is substantially a cylinder) is observed to exist in the layers (16) and (17) present immediately under the layer (15). The zirconium dioxide ZrO$_2$ of the layer (16) and the silicon dioxide SiO$_2$ of the layer (17) therefore absorb the marking wavelength slightly. The absorption being relatively weak, as may well be deduced from the resulting marking, this is compatible with the performance of the marking method according to the invention, because the visibility of the marking is not affected.

Example 3: Marking of an Ophthalmic Lens Consisting of a Substrate, an SiO$_2$ Sub-Layer, a Layer of ZrO$_2$, of a Layer of SiO$_2$, of a Layer of ZrO$_2$, of an Interior Layer of SnO$_2$, of an Exterior Layer of SiO$_2$, of an Antifouling Layer and of a Double Temporary Layer FIGS. 6 to 9 schematically illustrate this third example embodiment of the marking method according to the invention, only the nature of the layer (19) being modified with respect to the second example embodiment.

The ophthalmic lens (20) consists of a substrate (21) that is a lens of 1.5 index from Essilor Internationale including an anti-scratch coating of trademark Mithril®, and that includes, thereabove, an interference coating including, successively, starting from the varnish present on the substrate, a thick layer (19) made of SiO$_2$, a first layer (18) of zirconium oxide ZrO$_2$, a first layer (17) of silicon dioxide SiO$_2$, a second layer (16) of zirconium dioxide ZrO$_2$, a layer (15) of tin dioxide SnO$_2$ or interior layer, a second layer (14) of silicon dioxide SiO$_2$ or exterior layer, a (hydrophobic and/or oleophobic) anti-fouling coating layer (13), a layer (12) of magnesium difluoride MgF$_2$ of 37 nm thickness and a layer (11) of magnesium oxide MgO of a few nanometres thickness.

Layers (14, 15, 16, 17 and 18) together, ignoring the respective layers 12 and 11 of MgF$_2$ and MgO, which are temporary layers, form an interference coating that is here an antireflection coating, the thicknesses of the layers being calculated by means of a software package known to those skilled in the art (which takes into consideration the nature of these layers) in order to achieve a total reflection coefficient lower than 1%, for example 0.7% or 0.8% depending on the samples measured.

The nature and physical and optical characteristics of the layers are indicated in the following table:

| Number of the layer counted starting from the substrate/ Layer reference (illustration) | Material of the layer | Refractive index of the layer | Thickness of the layer (±3 nm) |
|---|---|---|---|
| 1/(19) | SiO$_2$ | 1.4658 | 150 nm |
| 2/(18) | ZrO$_2$ | 2.0038 | 20 nm |
| 3/(17) | SiO$_2$ | 1.4741 | 20 nm |
| 4/(16) | ZrO$_2$ | 2.0038 | 100 nm |
| 5/(15) | SnO$_2$ | 1.8432 | 6 nm |
| 6/(14) | SiO$_2$ | 1.4741 | 75 nm |

This embodiment of the method according to the invention, under the operating conditions of example 1 and in the same way as example 2, creates a pattern on the surface of the ophthalmic lens by local ablation of the exterior SiO$_2$ layer 14, of the layers 13, 12 and 11, which are outside the exterior SiO$_2$ layer 14, and an at least partial ablation of the interior layer 15, which is made of SnO$_2$, which is the interior layer ablated by the electromagnetic beam. In this marking spot (P), the value of the reflectance (Rm) measured in the ablated zone is about 10%, or more precisely between 9.5% and 10.5% depending on the samples, i.e. about 12 times more than Re.

The invention claimed is:

1. A method for marking an optical article, said method comprising:
   at least one step of using a marking machine on the optical article,
   the marking machine including an electromagnetic source configured to emit an electromagnetic beam having a set radiation wavelength called the marking wavelength, and
   the optical article including a substrate having a main face coated with an interference coating, said interference coating comprising at least two superposed layers including an interior layer and an exterior layer, the interior layer being located between the substrate and the exterior layer, the interference coating having a reflection coefficient Re in a visible domain of 380-780 nm, the at least one step of using the marking machine comprising:

irradiating at least the interior layer in a marking spot, by means of the electromagnetic beam at the marking wavelength, so as to ablate, in the marking spot, the interior layer, over at least one portion of a thickness of the interior layer, and any layer located between the electromagnetic source and the interior layer, an ablated zone thus ablated having a reflection coefficient Rm in the visible domain, Rm being different from Re by at least 1%, the interior layer absorbing the marking wavelength more greatly than any layer that is located, prior to carrying out the at least one step of using the marking machine, between the electromagnetic source and the interior layer.

2. The marking method as claimed in claim 1, wherein the difference between Rm and Re is, in absolute value, larger than 3%.

3. The marking method as claimed in claim 2, wherein the difference between Rm and Re is, in absolute value, larger than 5%.

4. The marking method as claimed in claim 1, wherein the irradiating is carried out by emitting a focused beam of pulsed ultraviolet laser radiation having at least the following parameters:

a radiation wavelength comprised in an interval of 200 to 400 nm, and a pulse duration comprised in an interval of 0.1 to 5 ns, and an energy per pulse comprised in an interval of 0.1 to 10 µJ, and, in the marking spot, a beam diameter comprised in an interval of 5 to 50 µm.

5. The marking method as claimed in claim 4, wherein the radiation wavelength of the beam of pulsed ultraviolet laser radiation performing the irradiating is comprised in an interval of 200 to 300 nm, and the interior layer comprises tin.

6. The marking method as claimed in claim 5, wherein the interior layer consists essentially of tin dioxide $SnO_2$.

7. The marking method as claimed in claim 4, wherein the radiation wavelength is within a range of 200 to 300 nm, and the energy per pulse is within a range of 0.5 to 3 µJ.

8. The marking method as claimed in claim 1, wherein the interior layer has a thickness comprised in an interval of 1 to 100 nm, and the sum of ire thicknesses of the interior layer and of the exterior layer is comprised between 5 and 300 nm.

9. The marking method as claimed in claim 8, wherein the interior layer has a thickness within a range of 4 to 15 nm, and wherein the sum of the thicknesses of the interior layer and of the exterior layer is in a range of 45 to 175 nm.

10. The marking method as claimed in claim 1, wherein the interference coating includes at least one absorbent layer.

11. The marking method as claimed in claim 10, wherein all the layers counted from the interior layer to the exterior layer together absorb at least 0.5% of the transmitted visible light.

12. The marking method as claimed in claim 1, wherein a difference between the amount of light transmitted by the ablated zone and by the unablated zone is comprised between −0.5×(Rm-Re) and 0.5×(Rm-Re), (Rm-Re) being understood to represent the absolute value of the difference between Re and Rm.

13. The marking method as claimed in claim 1, wherein the interference coating is an antireflection coating and comprises, from the surface of the substrate or of a varnish present on the substrate, to the exterior, a layer of $ZrO_2$, of 5 to 40 nm thickness, a layer of $SiO_2$, of 10 to 55 nm thickness, a layer of $ZrO_2$, of 20 to 150 nm thickness, an interior layer of $SnO_2$, of 4 to 15 nm thickness, and an exterior layer of $SiO_2$, of 50 to 120 nm thickness.

14. The marking method as claimed in claim 1, wherein the interference coating is itself coated with a surface coating.

15. The marking method as claimed in claim 1, wherein the irradiating is carried out repeatedly so as to locally mark a region of a main surface of the substrate of the optical article by means of multiple marking spots, said region forming a predefined pattern called the marking pattern.

16. The marking method as claimed in claim 15, wherein there is a continuity between the marking spots that define the region forming the marking pattern, said region including less than 1% per unit area of residues from the ablated layers.

17. The marking method as claimed in claim 15, wherein the irradiating is carried out with a pitch of dimension smaller than or equal to the dimensions of the marking spot.

18. The marking method as claimed in claim 1, wherein the reflection at the marking spot has a colour, in saturation and/or in hue, different from that of the reflection of an unablated zone.

19. The marking method as claimed in claim 1, wherein the electromagnetic beam is a laser beam, and the electromagnetic source is a laser source.

20. An optical article, comprising:

a substrate having a main face coated with an interference coating, said interference coating comprising at least two superposed layers of materials including an interior layer and an exterior layer, the interior layer being located between the substrate and the exterior layer, the interference coating having a reflection coefficient Re in a visible domain of 380-780 nm;

said optical article comprising a marking pattern on a surface of the interference coating, the marking pattern being formed by a plurality of substantially identical marking spots, each marking spot corresponding to a localized absence of at least one portion of a thickness of the interior layer and of any layer located between said surface and the interior layer, an ablated zone having a reflection coefficient Rm in the visible domain such that Re is different from Rm by at least 1%, wherein the interior layer absorbs a marking wavelength more greatly than any layer located between an electromagnetic source and the interior layer.

* * * * *